United States Patent
Zhao et al.

(10) Patent No.: US 10,650,335 B2
(45) Date of Patent: May 12, 2020

(54) WORKER GROUP IDENTIFICATION

(71) Applicants: Microsoft Technology Licensing, LLC, Redmond, WA (US); Bo Zhao, San Mateo, CA (US); Ariel Fuxman, San Francisco, CA (US); Hongwei Li, Tianmen (CN)

(72) Inventors: Bo Zhao, San Mateo, CA (US); Ariel Fuxman, San Francisco, CA (US); Hongwei Li, Tianmen (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 268 days.

(21) Appl. No.: 15/119,349

(22) PCT Filed: Feb. 11, 2014

(86) PCT No.: PCT/CN2014/071962
§ 371 (c)(1),
(2) Date: Aug. 16, 2016

(87) PCT Pub. No.: WO2015/120574
PCT Pub. Date: Aug. 20, 2015

(65) Prior Publication Data
US 2017/0011328 A1    Jan. 12, 2017

(51) Int. Cl.
*G06Q 10/06* (2012.01)

(52) U.S. Cl.
CPC ..... *G06Q 10/063114* (2013.01); *G06Q 10/06* (2013.01); *G06Q 10/06313* (2013.01)

(58) Field of Classification Search
CPC ........... G06Q 10/063114; G06Q 10/06; G06Q 10/06313

(Continued)

(56) References Cited

U.S. PATENT DOCUMENTS 6,587,832 B1 * 7/2003 Beck ............... G06Q 10/06
                                                  705/7.34
6,735,570 B1 * 5/2004 Lacy ............ G06Q 10/063112
                                                  705/7.14

(Continued)

FOREIGN PATENT DOCUMENTS

WO    2015120574    8/2015

OTHER PUBLICATIONS

Altun et al., "Unifying Divergence Minimization and Statistical Inference via Convex Duality", In Proceedings of the 19th Annual Conference on Learning Theory, Jun. 22, 2006, 15 pages. Retrieved at <<http://ttic.uchicago.edu/~altun/pubs/AltSmo-COLT06.pdf>>.
"Amazon Mechanical Turk", Retrieved on: Nov. 26, 2013, Available at: https://www.mturk.com/mturk.

(Continued)

*Primary Examiner* — Dylan C White
(74) *Attorney, Agent, or Firm* — International IP Law Group, PLLC

(57) ABSTRACT

Various techniques for identifying a target worker group are described herein. In one example, a method includes detecting a response to a task from each worker in a group of workers and detecting a set of characteristics that correspond to each worker, wherein each characteristic comprises at least one attribute. The method can also include detecting a first attribute that corresponds to workers that provide responses with an accuracy above a threshold value. Furthermore, the method can include identifying the target worker group, the target worker group comprising the workers corresponding to the detected first attribute. The method may also include sending an additional task to the target worker group.

17 Claims, 4 Drawing Sheets

(58) Field of Classification Search
USPC .................................................. 705/7.15
See application file for complete search history.

(56) References Cited

U.S. PATENT DOCUMENTS

| | | | |
|---|---|---|---|
| 8,914,321 B2 | 12/2014 | Zhou et al. | |
| 9,378,061 B2* | 6/2016 | Panferov | G06F 9/5038 |
| 2010/0046842 A1 | 2/2010 | Conwell | |
| 2012/0029963 A1* | 2/2012 | Olding | G06Q 10/06 705/7.14 |
| 2012/0029978 A1* | 2/2012 | Olding | G06Q 10/06 705/7.42 |
| 2012/0035971 A1 | 2/2012 | Friedlander et al. | |
| 2012/0088220 A1* | 4/2012 | Feng | G09B 7/00 434/362 |
| 2012/0131572 A1* | 5/2012 | Shae | G06F 9/45558 718/1 |
| 2012/0265573 A1* | 10/2012 | Van Pelt | G06Q 10/06311 705/7.14 |
| 2012/0284090 A1* | 11/2012 | Marins | G06Q 10/0631 705/7.39 |
| 2013/0096968 A1* | 4/2013 | Van Pelt | G06Q 10/063112 705/7.13 |
| 2013/0138461 A1 | 5/2013 | Shahraray et al. | |
| 2013/0185138 A1* | 7/2013 | Roy | G06Q 30/02 705/14.35 |
| 2013/0197954 A1* | 8/2013 | Yankelevich | G06Q 30/02 705/7.13 |
| 2013/0231969 A1* | 9/2013 | Van Pelt | G06Q 10/06311 705/7.13 |
| 2014/0025416 A1* | 1/2014 | Huang | G06Q 10/06313 705/7.14 |
| 2014/0075004 A1* | 3/2014 | Van Dusen | H04L 41/04 709/223 |
| 2014/0214607 A1* | 7/2014 | Kazai | G06Q 30/0609 705/26.35 |
| 2015/0025963 A1* | 1/2015 | Bolot | G06Q 30/0251 705/14.49 |
| 2015/0120350 A1* | 4/2015 | Gujar | G06Q 10/063112 705/7.14 |
| 2015/0213360 A1* | 7/2015 | Venanzi | G06Q 10/06311 706/12 |
| 2015/0220864 A1* | 8/2015 | Karande | G06Q 10/06311 705/7.13 |
| 2015/0220871 A1* | 8/2015 | Rajan | G06Q 10/063112 705/7.14 |
| 2015/0254596 A1* | 9/2015 | Nayar | G06Q 10/063112 705/7.14 |
| 2015/0262111 A1* | 9/2015 | Yu | G06Q 10/063112 705/7.14 |
| 2015/0265160 A1* | 9/2015 | Kato | A61B 5/02455 600/500 |
| 2015/0302340 A1* | 10/2015 | Dasgupta | H04W 4/029 705/7.15 |
| 2015/0317582 A1* | 11/2015 | Nath | G06Q 10/06 705/7.13 |
| 2015/0356488 A1* | 12/2015 | Eden | G06Q 50/01 705/7.41 |
| 2016/0034840 A1* | 2/2016 | Venanzi | G06Q 10/063112 705/7.14 |
| 2016/0140477 A1* | 5/2016 | Karanam | G06Q 10/063112 705/7.14 |
| 2016/0148245 A1* | 5/2016 | Celis | G06Q 30/0241 705/14.11 |
| 2016/0180278 A1* | 6/2016 | Celis | G06Q 10/063114 705/7.15 |

OTHER PUBLICATIONS

Boyd et al.,"Convex Optimization", Published on: Mar. 8, 2004, Available at: http://www.google.co.in/url?sa=t&act=j&q=&esrc=s&frm=1&source=web&cd=3&cad=rja&ved=0CEMQFjAC&url=http%3A%2F%2Fwww.stanford.edu%2F-boyd%2Fcvxbook%2Fbv_cvxbook.pdf&ei=o4mVUurVMImtrAeN6YCQDg&usg=AFQjCNGE-57N-6ujjjvAZtUHAo_dU9V3JA8Lbvm=bv.57155469,d.bmk.

"CrowdFlower", Retrieved on: Nov. 26, 2013, Available at: http://crowdflower.com/.

Dawid et al., "Maximum Likelihood Estimation of Observer Error-Rates Using the EM Algorithm", In Journal of the Royal Statistical Society. Series C (Applied Statistics), vol. 28, Issue 1, Retrieved on: Nov. 26, 2013, 10 pages.

Dekel et al., "Vox Populi: Collecting High-Quality Labels from a Crowd", In Proceedings of the 22nd Annual Conference on Learning Theory, Jun. 2009, 10 pages. Retrieved at <<http://research.microsoft.com/pubs/80597/DekelSh09a.pdf>>.

Dempster et al., "Maximum Likelihood from Incomplete Data via the EM Algorithm", In Journal of the Royal Statistical Society, Series B, vol. 39, Issue 1, Retrieved on: Nov. 26, 2013, 39 pages.

Deng et al., "ImageNet: A Large-Scale Hierarchical Image Database", In Proceedings of in IEEE Conference on Computer Vision and Pattern Recognition, Jun. 20, 2009, 8 pages. Retrieved at <<http://image-net.org/papers/imagenet_cvpr09.pdf>>.

Dudik et al., "Maximum Entropy Density Estimation with Generalized Regularization and an Application to Species Distribution Modeling", In Journal of Machine Learning Research, Jun. 2007, 44 pages. Retrieved at <<http://www2.research.att.com/~phillips/pdf/dudik07a.pdf>>.

Ertekin et al., "Approximating the Wisdom of the Crowd", In Proceedings of Workshop on Computational Social Science and the Wisdom of Crowds, Dec. 17, 2011, 5 pages.

Ipeirotis et al., "Quality Management on Amazon Mechanical Turk", In Proceedings of the ACM SIGKDD Workshop on Human Computation, Jul. 25, 2010, 4 pages. Retrieved at <<http://people.stern.nyu.edu/panos/publications/hcomp2010.pdf>>.

Kamar, et al., "Combining Human and Machine Intelligence in Large-Scale Crowdsourcing" In Proceedings of the 11th International Conference on Autonomous Agents and Multiagent Systems, Jun. 4, 2012, 8 pages.

Karger et al., "Iterative Learning for Reliable Crowdsourcing Systems", In Proceedings of Advances in Neural Information Processing Systems, Dec. 12, 2011, 9 pages. Retrieved at <<http://books.nips.cc/papers/files/nips24/NIPS2011_1102.pdf>>.

Kazai et al., "Worker Types and Personality Traits in Crowdsourcing Relevance Labels", In Proceedings of the 20th ACM Conference on Information and Knowledge Management, Oct. 24, 2011, 4 pages.

Lebanon et al., "Boosting and Maximum Likelihood for Exponential Models", In Proceedings of Advances in Neural Information Processing Systems, Dec. 3, 2001, 8 pages. Retrieved at <<http://www.cc.gatech.edu/fac/lebanon/papers/nips01.pdf>>.

Veal et al., "A View of the EM Algorithm that Justifies Incremental, Sparse, and other Variants", In Proceedings of the NATO Advanced Study Institute on Learning in Graphical, Mar. 26, 1998, 14 pages.

Rasch, G., "On General Laws and the Meaning of Measurement in Psychology", In Proceedings of the 4th Berkeley Symposium on Mathematical Statistics and Probability, Jan. 1961, 13 pages. Retrieved at <<http://econ.ucsb.edu/~doug/245a/Papers/Meaning%20of%20Measurement.pdf>>.

Raykar et al., "Learning From Crowds", In Journal of Machine Learning Research, vol. 11, Mar. 1, 2010, 26 pages. Retrieved at <<http://ljsavage.wharton.upenn.edu/~lzhao/papers/MyPublication/LearningFromCrowd_JMLR_2010.pdf>>.

Smyth et al., "Inferring Ground Truth from Subjective Labelling of Venus Images", In Proceedings of Advances in Neural Information Processing Systems, Nov. 27, 1995, 9 pages.

Snow et al., "Cheap and Fast—But is it Good?: Evaluating Non-Expert Annotations for Natural Language Tasks" In Proceedings of the Conference on Empirical Methods in Natural Language Processing, Oct. 25, 2008, 10 pages. Retrieved at <<http://acl.eldoc.ub.rug.nl/mirror/D/D08/D08-1027.pdf>>.

Welinder et al., "The Multidimensional Wisdom of Crowds", In Proceedings of Advances in Neural Information Processing Systems 23, Dec. 6, 2010, 9 pages. Retrieved at <<http://www.vision.caltech.edu/visipedia/papers/WelinderEtaINIPS10.pdf>>.

Whitehill et al., "Whose Vote Should Count More: Optimal Integration of Labels from Labelers of Unknown Expertise", In Pro-

(56) References Cited

OTHER PUBLICATIONS ceedings of Advances in Neural Information Processing Systems 22, Dec. 7, 2009, 9 pages. Retrieved at <<http://books.nips.cc/papers/files/nips22/NIPS2009_0100.pdf>>.
Zhou et al., "Learning from the Wisdom of Crowds by Minimax Entropy", In Proceedings of Advances in Neural Information Processing Systems 25, Dec. 3, 2012, 9 pages. Retrieved at <<http://research.microsoft.com/pubs/175659/crowdwisdom.pdf>>.
Zhu et al., "Minimax Entropy Principle and Its Applications to Texture Modeling" In Proceedings of Neural Computation, vol. 9, Issue 8, Nov. 1997, 39 pages.
K. Forbes and E. Fiume, "An Efficient Search Algorithm for Motion Data Using Weighted PCA", Sea Proceeding of the Acm Siggraph/eurographics Symposium on Computer Animation, 2005, 10 pages.
Raykar, et al., "Ranking Annotators for Crowd Sourced Labeling Tasks", Neural Information Processing Systems Conference, Dec. 11, 2011, pp. 9. Retrieved at <<http://books.nips.cc/papers/files/nips24/NIPS2011_1026.pdf>>.
Hosseini, et al., "On Aggregating Labels from Multiple Crowd Workers to Infer Relevance of Documents", 34th European conference on Advances in Information Retrieval, Apr. 1, 2012, pp. 13. Retrieved at <<http://www0.cs.ucl.ac.uk/staff/ingemar/Content/papers/2012/ECIR2012.pdf>>.
Le, et al., "Ensuring Quality in Crowdsourced Search Relevance Evaluation: The Effects of Training Question Distribution", In SIGIR 2010 Workshop on Crowdsourcing for Search Evaluation, Jul. 19, 2010, pp. 4. Retrieved at <<http://ir.ischool.utexas.edu/cse2010/materials/leetal.pdf>>.
Joachims, et al., "Accurately Interpreting Clickthrough Data as Implicit Feedback", In Proceedings of the 28th Annual nternational ACM SIGIR Conference on Research and Development in Information Retrieval, Aug. 15, 2005, pp. 8. Retrieved at <<http://ils.unc.edu/courses/2011_fall/inls509_001/papers/Joachims05.pdf>>.
Sheng, et al., "Get Another Label? Improving Data Quality and Data Mining Using Multiple, Noisy Labelers", In Proceedings of the 14th ACM SIGKDD International Conference on Knowledge Discovery and Data Mining, Aug. 24, 2008, pp. 9. Retrieved at <<http://storm.cis.fordham.edu/~gweiss/selected-papers/get-another-label-provost-kdd08.pdf>>.
Jung et al., "UT Austin in the TREC 2012 Crowdsourcing Track's Image Relevance Assessment Task", In the Twenty-First Text Retrieval Conference Proceedings, Nov. 8, 2012, 12 pages.
Oyama et al., "Accurate Integration of Crowdsourced Labels Using Workers' Self-Reported Confidence Scores", In Proceedings of the Twenty-Third International Joint Conference on Artificial Intelligence, Aug. 3, 2013, pp. 2554-2560.
Sakurai et al., "Quality-Control Mechanism Utilizing Worker's Confidence for Crowdsourced Tasks", In Proceedings of the International Conference on Autonomous Agents and Multiagent Systems, May 6, 2013, pp. 1347-1348, St. Paul, MI, USA.
International Search Report for PCT Application No. PCT/CN2014/071962, dated Jul. 9, 2014, 4 pages.
International Preliminary Report on Patentability for PCT Application No. PCT/CN2014/071962, dated Jul. 9, 2014, 5 pages.
Written Opinion of the International Searching Authority for PCT Application No. PCT/CN2014/071962, dated Jul. 9, 2014, 4 pages.

\* cited by examiner

WORKER GROUP IDENTIFICATION

CROSS-REFERENCE TO RELATED APPLICATIONS

Pursuant to 35 U.S.C. § 371, this application is the United States National Stage Application of International Patent Application No. PCT/CN2014/071962, filed Feb. 11, 2014, the contents of which are incorporated by reference as if set forth in their entirety herein.

BACKGROUND

As the amount of digital content continues to grow, the complexity of tasks based on the digital content can rapidly increase. A task may include identifying the class of each item in a set of items. In some examples, workers can provide labels that identify an item's class. A machine learning model can be trained based on the labels to perform the classification task. In some examples, the machine learning model can select the appropriate label for an item from the labels provided by the workers based on specific criteria or algorithms. For example, in email services, users can provide labels that identify unsolicited messages (also referred to as spam). Allowing users to label spam is one crowd sourcing technique for distinguishing solicited email from spam. In some examples, a classifier can then be trained from the labeled spam.

Crowdsourcing is a process where the labeling task is outsourced to a distributed group of workers. Each worker classifies, i.e., labels, a set of items. The labels provided by the crowd are analyzed in an attempt to identify the correct labels. Crowdsourcing can provide a large number of labels at a relatively low cost. However, in crowdsourcing, the workers may be non-experts. Thus, the labels from a crowd may include a number of correct labels and a number of incorrect labels. Because each item is labeled by multiple workers who do not typically agree unanimously, the judgments are combined to produce a single label for the item. In some examples, judgments can be combined in a variety of ways, such as majority voting, to increase the accuracy of the crowd sourced techniques.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

An embodiment described herein provides a method for identifying a target worker group. In one example, a method includes detecting a response to a task from each worker in a group of workers and detecting a set of characteristics that correspond to each worker, wherein each characteristic comprises at least one attribute. The method can also include detecting a first attribute that corresponds to workers that provide responses with an accuracy above a threshold value. Furthermore, the method can include identifying the target worker group, the target worker group comprising the workers corresponding to the detected first attribute. The method can also include sending an additional task to the target worker group.

Another embodiment described herein includes one or more computer-readable storage media for identifying a target worker group comprising a plurality of instructions. In some embodiments, the plurality of instructions, when executed by a processor, cause the processor to detect a response to a task from each worker in a group of workers and detect a set of characteristics that correspond to each worker, wherein each characteristic comprises at least one attribute. The plurality of instructions, when executed by a processor, can also cause the processor to detect a first attribute that corresponds to workers that provide responses with an accuracy above a threshold value and identify the target worker group, the target worker group comprising the workers corresponding to the detected first attribute. Furthermore, the plurality of instructions, when executed by a processor, can cause the processor to send an additional task to the target worker group.

Another embodiment described herein includes a computing device for identifying a target worker group comprising a processor. In some embodiments, the processor can detect a response to a task from each worker in a group of workers and detect a set of characteristics that correspond to each worker, wherein each characteristic comprises at least one attribute. The processor can also detect a first attribute that corresponds to workers that provide responses with an accuracy above a threshold value and identify the target worker group, the target worker group comprising the workers corresponding to the detected first attribute. Furthermore, the processor can send an additional task to the target worker group.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
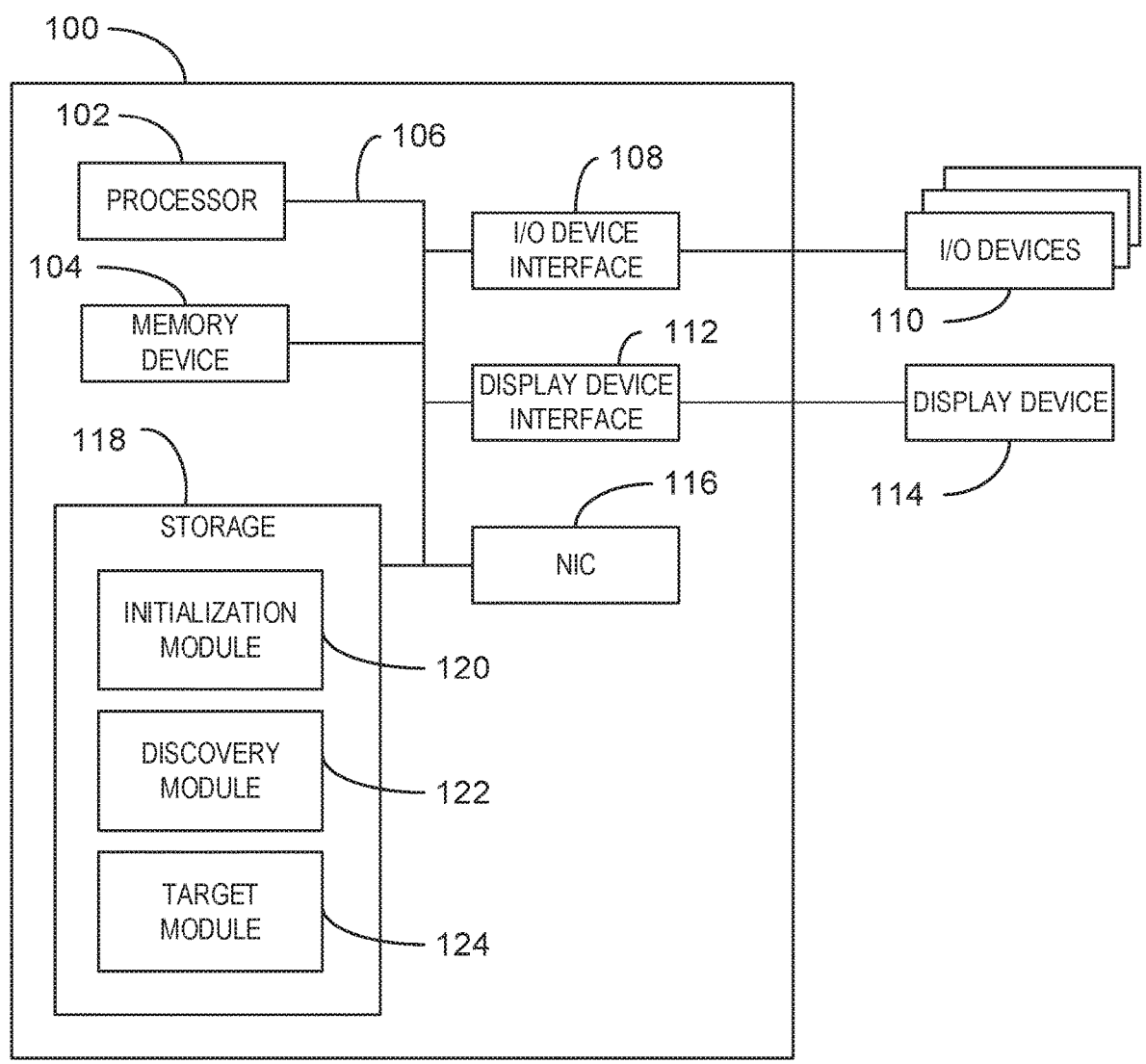
FIG. 1 is a block diagram of an example of a computing system that identify a target worker group.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Introduction

According to embodiments described herein, a target worker group can be identified which can provide accurate responses to tasks. A task, as referred to herein, can include any suitable question, or requested action, which prompts a response from a worker. A worker, as referred to herein, can include any suitable individual or computing device that can return a response to a task. In some embodiments, the tasks are distributed to a group of workers using crowd sourcing techniques. For example, a task can be distributed to a group of workers and a response can be detected from each worker. The responses from the workers can then be evaluated and, in some examples, a target worker group can be identified that returns responses with an accuracy above a threshold value. In some embodiments, the crowd sourcing framework can also include sending additional tasks to the identified target worker group which can improve the accuracy of the crowd sourcing results.

FIG. 1 is a block diagram of an example of a computing system that can identify a target worker group. The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to identify a worker group.

The processor 102 may be connected through a system bus 106 (e.g., PCI®, PCI-Express®, etc.) to an input/output (I/O) device interface 108 adapted to connect the computing system 100 to one or more I/O devices 110. The I/O devices 110 may include, for example, a keyboard, a gesture recognition input device, a voice recognition device, and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display device interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. A network interface card (NIC) 116 may also be adapted to connect the computing system 100 through the system bus 106 to a network (not depicted).

The storage 118 can include a hard drive, an optical drive, a USB flash drive, an array of drives, or any combinations thereof. The storage 118 may include an initialization module 120, a discovery module 122, and a target module 124. In some embodiments, the initialization module 120 can send a task to any suitable number of workers. As discussed above, a task can include any suitable question or requested action that prompts a worker for a response. In some embodiments, the initialization module 120 can also request information, such as characteristics, from each worker. A characteristic, as referred to herein, can include any suitable trait or qualification related to a worker. For example, a characteristic can include an educational background, a college major, languages spoken, ethnic background, gender, age, or hobbies, among others.

In some embodiments, the discovery module 122 can detect the characteristics that correspond to the group of workers. The discovery module 122 can also identify a target worker group based on the characteristics. In some examples, the target worker group can provide responses to a task with an accuracy rate that exceeds a threshold value. For example, a target worker group with a common characteristic may provide responses that are more accurate than a group of workers with other characteristics.

In some embodiments, the discovery module 122 can identify the target worker group based on a top-down technique or a bottom-up technique. A top-down technique, as referred to herein, can include detecting a target worker group by assessing the accuracy of the responses provided by each individual worker based on the worker's characteristics. For example, the discovery module 122 may determine that a characteristic includes two different attributes. An attribute, as referred to herein, can include any suitable type of a characteristic. For example, an attribute associated with a college major may include engineering, art, or english, among others. In some embodiments, the discovery module 122 can determine that workers with a particular attribute corresponding to a characteristic may provide responses to a task with an accuracy that is above a threshold. For example, workers with a business major attribute, which corresponds to a college major characteristic, may provide responses that are more accurate than workers with other attributes corresponding to the college major attribute.

In some embodiments, the discovery module 122 may use the top-down technique to generate a subgroup of workers that provide responses with a greater accuracy than other workers. For example, the discovery module 122 may use the top-down technique to identify any suitable number of attributes corresponding to any suitable number of characteristics that correspond to workers that provide responses to tasks with an accuracy above a threshold value. The top-down technique is discussed in greater detail below in relation to FIG. 3.

In some embodiments, the discovery module 122 can also use a bottom-up technique to identify a target worker group. A bottom-up technique, as referred to herein, can include detecting a target worker group based on subgroups of workers that share a common attribute or set of attributes. In some examples, the discovery module 122 can use the bottom-up technique to identify a target group of workers by combining workers from multiple subgroups. For example, the discovery module 122 may determine that workers with a first attribute from a first subgroup provide responses to tasks with an accuracy rate that exceeds a threshold value. The discovery module 122 may also determine that workers with a second attribute from a second subgroup provide responses to tasks with an accuracy rate that exceeds a threshold value. In some embodiments, the discovery module 122 may identify the target worker group based on workers that share the first attribute and the second attribute. The bottom-up technique is described in greater detail below in relation to FIG. 3.

In some embodiments, the target module 124 can send additional tasks to the identified target worker group. For example, a small part of a task can be sent to a group of workers. Once the discovery module 122 identifies the target worker group, the target module 124 can send the remaining portion of a task or additional tasks to the target worker group.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the initialization module 120, the discovery module 122, and the target module 124 may be partially, or entirely, implemented in hardware and/or in the processor 102. For example, the functionality may be implemented with an application specific integrated circuit, in logic implemented in the processor 102, or in any other device.

Figure 2:
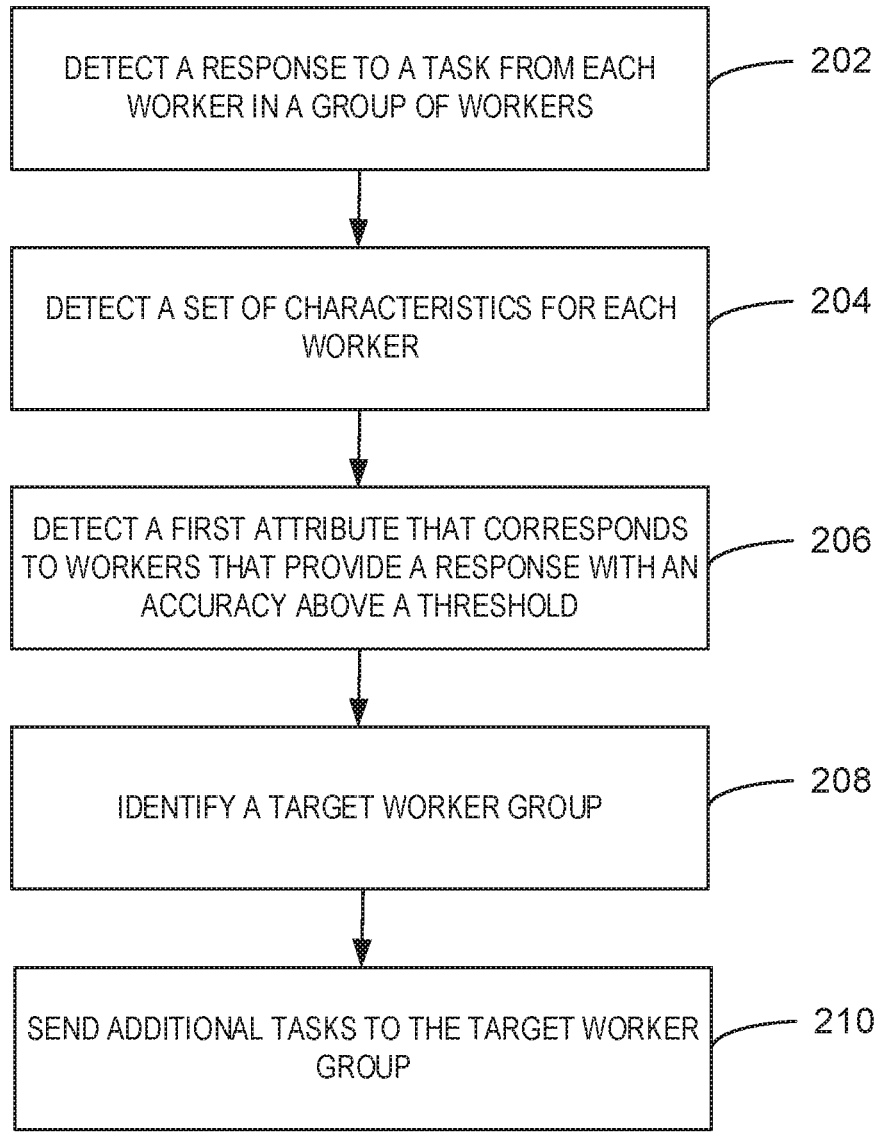
FIG. 2 is a process flow diagram of an example method for identifying a target worker group.

FIG. 2 is a process flow diagram of an example method for identifying a target worker group. The method 200 can be implemented with any suitable computing device, such as the computing system 100 of FIG. 1.

At block 202, the initialization module 120 can detect a response to a task from each worker in a group of workers. In some examples, the task may include any suitable number of multiple choice questions, or an action that requests a response, among others. In some embodiments, the group of workers can include any suitable number of individuals or computing devices that can provide responses to a task.

At block 204, the initialization module 120 can detect a set of characteristics that correspond to each worker, wherein each characteristic comprises at least one attribute. In some embodiments, characteristics are detected from information provided by workers through questionnaires or through worker profiles, and the like. As discussed above, a characteristic can include a college major, gender, age, languages spoken, or hobbies, among others. Each characteristic can correspond to any suitable number of attributes that represent different values of a characteristic. For example, an attribute for a gender characteristic may include male or female, while an attribute for a college major characteristic may include art, engineering, or business, among others. In some embodiments, detecting the set of characteristics comprises detecting the set of characteristics from a questionnaire corresponding to a task or detecting the set of characteristics from metadata in a crowd sourcing system, among others.

At block 206, the discovery module 122 can detect a first attribute that corresponds to workers that provide responses to a task with an accuracy above a threshold value. In some embodiments, the discovery module 122 can detect a relationship between the accuracy of a worker's response and a characteristic using any suitable mathematical operation, such as detecting an analysis of variance value (also referred to herein as an effect value), among others. In some embodiments, the discovery module 122 can identify workers associated with an effect value above a predetermined threshold value as quality workers that provide accurate responses to tasks. Calculating an effect value is described in greater detail below in relation to FIG. 3.

At block 208, the discovery module 122 can identify the target worker group, wherein the target worker group comprises the workers corresponding to the first attribute. In some examples, the discovery module 122 can also determine that the number of workers in the target worker group is to exceed a predetermined amount. As discussed above, the target worker group may use a top-down technique or a bottom-up technique to identify the workers to include in the target worker group. In some embodiments, the discovery module 122 may combine multiple groups or subgroups of workers with an accuracy above a threshold value to form the target worker group. Identifying the target worker group is described in greater detail below in relation to FIG. 3.

At block 210, the target module 124 can send additional tasks to the target worker group. For example, the target module 124 may determine that the target worker group can perform tasks related to a particular subject with an accuracy above a threshold value. If the target module 124 detects additional tasks related to the subject, the target module 124 can send the additional tasks to the identified set of workers. In some examples, the target module 124 may also send any additional task to the target worker group regardless of the subject matter of the additional task.

The process flow diagram of FIG. 2 is not intended to indicate that the operations of the method 200 are to be executed in any particular order, or that all of the operations of the method 200 are to be included in every case. Further, any number of additional operations may be included within the method 200, depending on the specific application.

Figure 3:
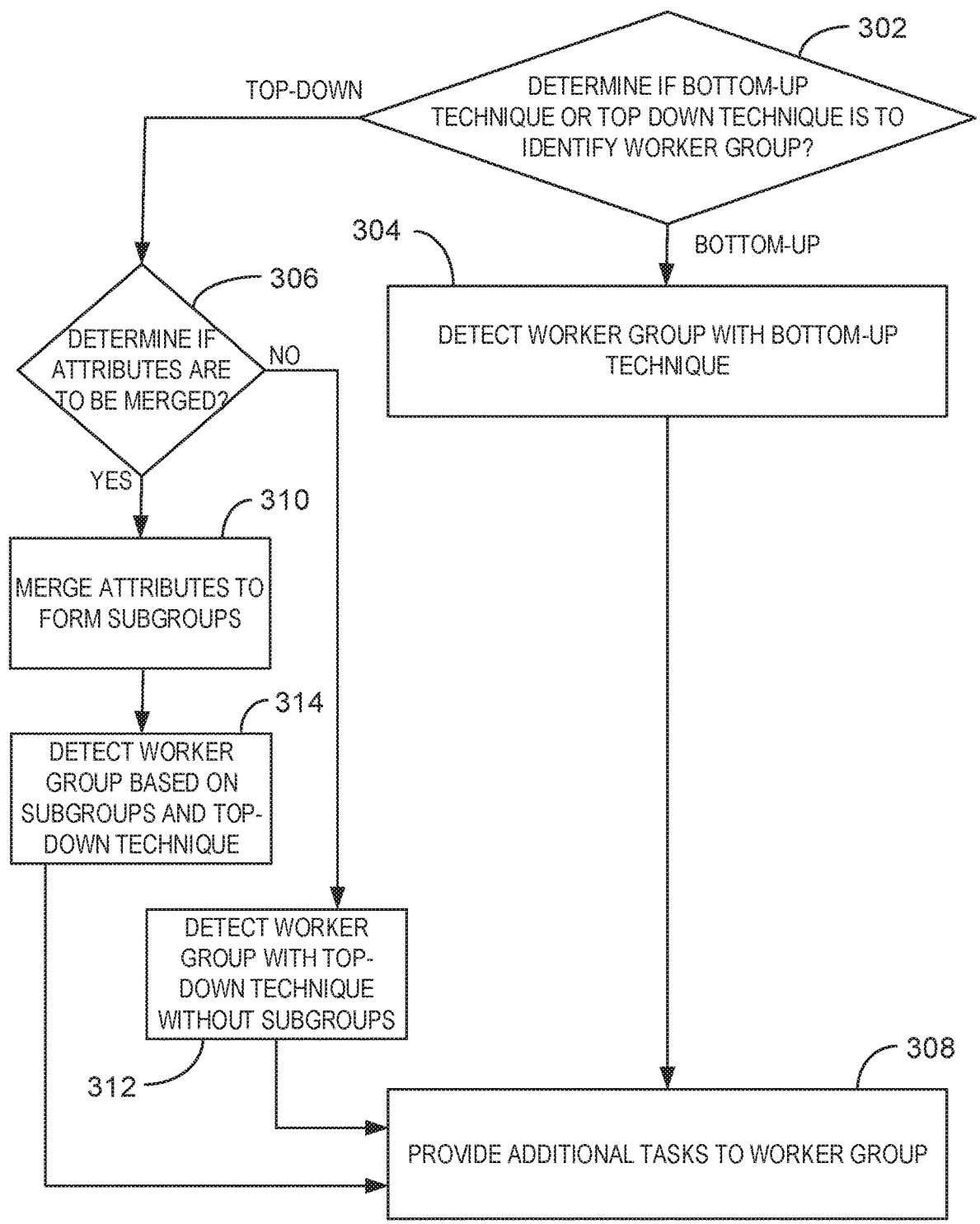
FIG. 3 is a process flow diagram of an example method illustrating various techniques for identifying a target worker group.

FIG. 3 is a process flow diagram of an example method for identifying a target worker group. The method 300 can be implemented with any suitable computing device, such as the computing system 100 of FIG. 1.

At block 302, the discovery module 122 can determine if a bottom-up technique or a top-down technique is to be used to identify the target worker group. As discussed above, a bottom-up technique can include detecting a target worker group based on subgroups of workers that share a common attribute or set of attributes. For example, a bottom-up technique may identify the target worker group by identifying attributes related to accurate responses and combine workers from different subgroups with the attributes related to accurate responses. For example, subgroups of workers may be partitioned based on characteristics such as gender, education level, or languages spoken, among others.

In contrast, as discussed above, a top-down technique can include assessing the accuracy of the responses provided by each individual worker based on the worker's characteristics. For example, the top-down technique may include generating subgroups of workers based on characteristics that correspond with workers that provide accurate responses. If the bottom-up technique is to be used to identify the target worker group, the process flow continues at block 304. If the top-down technique is to be used to identify the target worker group, the process flow continues at block 306.

At block 304, the discovery module 122 can detect a worker group based on a bottom-up technique. In some embodiments, the discovery module 122 can detect any suitable number of attributes and/or characteristics that correspond to each worker in a set of workers. In some examples, the discovery module 122 can use the following equation to determine the likelihood that a worker will provide an accurate response to a task based on the characteristics and attributes associated with the worker:

$$\tau_i \sim \beta_0 + \beta_1 X_i^{(1)} + \ldots + \beta_t X_i^{(t)} + \varepsilon, \forall i \in [M] \quad (1)$$

In Eq(1), $\tau_i$ (also referred to herein as an effect value) represents the accuracy of the responses provided by the worker. Additionally, $\beta = (\beta_0, \beta_1, \ldots, \beta_t)$, where $\beta$ represents a set of coefficients and $\varepsilon \sim N(0, \delta^2)$. In some examples, $\varepsilon$ represents Gaussian noise with mean value of zero. Each attribute related to a characteristic may receive a numerical value or coefficient from $\beta$ that indicates a probability that a worker with the attribute will provide an accurate response to a task. Furthermore, Eq(1) may assume that there are M workers and i represents each individual worker.

In some examples, the discovery module 122 can use any suitable mathematical operation to determine the set of coefficients, $\beta$, wherein each coefficient corresponds to an attribute. For example, the discovery module 122 may determine the coefficients using any suitable regression technique such as linear regression, or quadratic regression, among others. In some embodiments, the discovery module 122 can also multiply the detected coefficient by the numerical value assigned to each attribute. The discovery module 122 can calculate an effect value based on the sum of each coefficient multiplied by the numerical value assigned to each attribute. The discovery module 122 may also calculate the rank of each worker in descending order based on the effect value. In some examples, if the effect value associated with a worker is below a threshold value, the worker is deemed to provide inaccurate responses to tasks. If the effect value associated with a worker is above a threshold value, the worker is deemed to provide accurate responses to tasks. In some embodiments, the discovery module 122 can identify the workers with the highest effect values from any suitable number of subgroups and combine the identified workers to form the target worker group. In some embodiments, the bottom-up technique can include calculating an effect value for a second attribute, detecting that the effect value for the second attribute exceeds a threshold value, and detecting workers that correspond to the second attribute.

The process flow continues at block 308, where the discovery module 122 provides additional tasks to the target worker group. For example, the target worker group identified by the bottom-up technique may include any suitable number of workers that provide responses to questions in a task with an accuracy above a threshold. In some embodiments, the discovery module 122 can detect additional tasks and send the tasks to the target worker group to receive responses with an expected accuracy above a threshold.

If it is determined that a top-down technique is to be used to identify the target worker group at block 302, the process flow continues at block 306. At block 306, the discovery module 122 can determine if attributes corresponding to a characteristic are to be merged. In some embodiments, the discovery module 122 merges attributes when there are multiple attributes corresponding to a single characteristic and the number of workers associated with an attribute is below a predetermined pool size. For example, the discovery module 122 may detect that a single worker is associated with a business major attribute for a college major characteristic and the predetermined pool size may be equal to a number larger than one. In some embodiments, the discovery module 122 may combine the worker with the business major attribute with workers that have an engineering attribute to form a subgroup related to a combined business/engineering attribute.

If the discovery module 122 determines that attributes are to be merged, the process flow continues at block 310. If the discovery module 122 determines that attributes are not to be merged, the process flow continues at block 312.

At block 310, the discovery module 122 can merge attributes corresponding to characteristics to form subgroups. For example, the discovery module 122 may partition the workers into a subgroup based on any suitable attribute corresponding to a characteristic. In some embodiments, the discovery module 122 may also determine the attributes related to workers that provide accurate responses and the discovery module 122 can rank the attributes based on the associated accuracy of workers related to each attribute. In some embodiments, the discovery module 122 can also continue to combine attributes to form a subgroup that includes a number of workers that exceeds a predetermined pool size value. In some examples, the predetermined pool size value can be any suitable number such as half the total number of workers in a group. The resulting combined group of workers can be identified as a subgroup based on merged attributes for a characteristic.

At block 314, the discovery module 122 can detect a worker group based on the subgroups and a top-down technique. The top-down technique can generate subgroups based on characteristics that are related to a worker's ability to produce accurate responses. In some embodiments, the top-down technique includes detecting an effect value that represents the relationship between a characteristic and a worker's ability to produce accurate responses. For example, the discovery module 122 can detect an effect value that corresponds to each characteristic of a worker. Equation (2) below describes a relationship between a characteristic of a worker and the quality of the responses provided by the worker:

$$\tau_i \sim \beta_0 + \beta_1 X_i^{(k)} + \varepsilon, \forall i \in [M], F_k \in F \quad (2)$$

In Eq(2), $\tau_i$ (also referred to herein as the effect value) represents the quality of the responses provided by the worker regarding a task. Additionally, $\beta = (\beta_0, \beta_1, \ldots, \beta_t)$, where $\beta$ represents a set of coefficients and $\varepsilon \sim N(0, \delta^2)$. In some examples, $\varepsilon$ represents Gaussian noise with mean value of zero. Furthermore, M represents the number of workers, i corresponds to a particular worker, k represents a particular characteristic, and F represents a set of characteristics. The variable $X_i^{(k)}$ represents a characteristic vector that corresponds to each worker. For example, each characteristic vector can represent any suitable number of characteristics that correspond to a worker. Since not every characteristic is associated with the effect value, the discovery module 122 can use a significance threshold to control the significance of each test. In some examples, the significance threshold can be any suitable number that indicates a characteristic is associated with an effect value. In some embodiments, the top-down technique can include calculating an effect value for each worker and identifying a target worker group based on an attribute or characteristic shared among workers with effect values that are above a predetermined threshold.

In some embodiments, the effect value can be based on information gain. For example, the information gain can be calculated based on Equation (3) below:

$$f(w_i) = \ln L + w_i \ln w_i + (1 - w_i) \ln \frac{1 - w_i}{L - 1} \quad (3)$$

In Eq(3) above, the variable L represents the number of options for each task and $w_i$ represents a value between 0 and 1 that indicates the probability that a worker's response is accurate.

At block 312, the discovery module 122 can detect a worker group using the top-down technique without subgroups. For example, the discovery module 122 can determine an effect value for each worker with an attribute corresponding to a first characteristic. The discovery module 122 can also select a worker with an attribute corresponding to an effect value over a threshold value. In some embodiments, the top-down technique can include detecting a target worker group with any suitable number of attributes from any suitable number of characteristics associated with an effect value above a threshold.

In some examples, the top-down technique can also include detecting a target worker group based on multiple attributes. For example, in addition to detecting a first attribute that corresponds to accurate workers, the top-down technique can include detecting a second attribute from a second characteristic that corresponds to workers that provide responses with the accuracy value above the threshold value. In some embodiments, the top-down technique may also include generating a subgroup of workers, the subgroup of workers comprising workers corresponding to the first attribute and the second attribute, and modifying the target work group to include workers from the subgroup. In some embodiments, the top-down technique may also include detecting the target worker group is to include a number of workers that exceeds a threshold value, and modifying the target worker group to include additional workers using the top-down technique, wherein the number of workers in the modified target worker group exceeds the threshold value.

At block 308, the target module 124 can provide additional tasks to the identified worker group. In some embodiments, the target module 124 can select previously identified worker groups based on the subject matter of the task. For example, each worker group may be identified to perform tasks corresponding to particular subject matter. In some examples, the target module 124 may determine the subject matter of additional tasks and provide the additional tasks to the identified worker groups that have an effect value above a threshold.

The process flow diagram of FIG. 3 is not intended to indicate that the steps of the method 300 are to be executed in any particular order, or that all of the steps of the method 300 are to be included in every case. Further, any number of additional steps may be included within the method 300, depending on the specific application.

Figure 4:
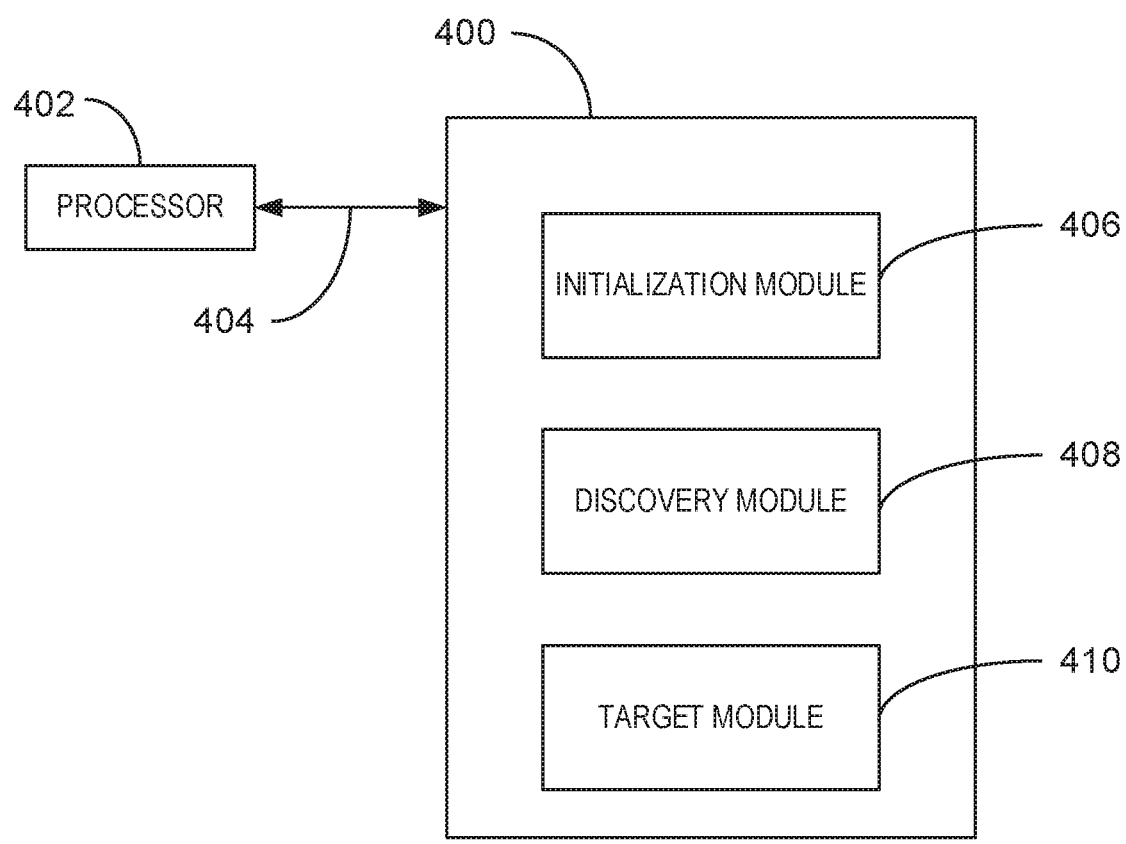
FIG. 4 is a block diagram showing a tangible, computer-readable storage media that can identify a target worker group.

FIG. 4 is a block diagram showing a tangible, computer-readable storage media that can identify a target worker group. The tangible, computer-readable storage media 400 may be accessed by a processor 402 over a computer bus 404. Furthermore, the tangible, computer-readable storage media 400 may include code to direct the processor 402 to perform the current method.

The various software components discussed herein may be stored on the tangible, computer-readable storage media 400, as indicated in FIG. 4. For example, the tangible computer-readable storage media 400 can include an initialization module 406, a discovery module 408, and a target module 410. In some embodiments, the initialization module 406 can detect attributes and characteristics that correspond to any suitable number of workers. The discovery module 122 can use a top-down technique or bottom-up technique to identify a target worker group that can provide responses to a task with an accuracy that is above a threshold value. In some embodiments, the target module 124 can send additional tasks to the identified target worker group.

It is to be understood that any number of additional software components not shown in FIG. 4 may be included within the tangible, computer-readable storage media 400, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

What is claimed is:

1. A method for identifying a target worker group comprising:
   detecting, via a processor, a response to a task from each worker in a group of workers;
   detecting, via the processor, a set of characteristics that correspond to each worker, wherein at least one characteristic comprises a plurality of attributes;
   generating, via the processor, the target worker group based on a top-down technique comprising:
      detecting that the at least one characteristic has a higher effect value than another characteristic of the set of characteristics, wherein the effect value indicates a likelihood that workers having the characteristic will provide an accurate response to a particular task;

calculating an effect value for each attribute of the plurality of attributes of the at least one characteristic, wherein the effect value indicates a likelihood that workers having the attribute for the characteristic will provide an accurate response to the particular task;

ranking the attributes by the effect values to generate a subgroup based on a higher ranked attribute;

modifying the target worker group to include workers from the subgroup, the target worker group comprising the workers corresponding to a first attribute; and providing the particular task to the target work group; and modifying, via the processor, a machine learning model to perform a classification task via training on a label identified in a response of each worker in the target worker group to the particular task.

2. The method of claim 1, wherein the top-down technique comprises:

detecting a second attribute from a second characteristic that corresponds to workers that provide responses with an accuracy value above a threshold value;

generating a subgroup of workers, the subgroup of workers comprising workers corresponding to the first attribute and the second attribute; and modifying the target worker group to include workers from the subgroup.

3. The method of claim 2, comprising:

detecting the target worker group is to include a number of workers that exceeds a threshold value; and modifying the target worker group to include additional workers using the top-down technique, wherein the number of workers in the modified target worker group exceeds the threshold value.

4. The method of claim 1, wherein identifying the target worker group comprises a bottom-up technique.

5. The method of claim 4, wherein the bottom-up technique comprises:

calculating an effect value for a second attribute;

detecting that the effect value for the second attribute exceeds a threshold value;

generating a modified target worker group comprising the target worker group and workers that correspond to the second attribute.

6. The method of claim 1, wherein detecting the set of characteristics comprises detecting the set of characteristics from a questionnaire corresponding to the task or detecting the set of characteristics from metadata in a crowd sourcing system.

7. The method of claim 1, wherein the top-down technique generates the subgroup based on characteristics associated with the effect value based on an information gain associated with a number of options for each task.

8. The method of claim 1, wherein the top-down technique further comprises merging higher ranked attributes to generate the subgroup in response to detecting that a highest ranked attribute comprises a pool size that is less than a predetermined pool size, wherein the generated subgroup comprises a pool size that exceeds the predetermined pool size.

9. One or more computer-readable storage devices for identifying a target worker group comprising a plurality of instructions that, when executed by a processor, cause the processor to:

detect a response to a task from each worker in a group of workers;

detect a set of characteristics that correspond to each worker, wherein at least one characteristic comprises at least one a plurality of attributes;

generate the target worker group based on a top-down technique comprising:

detecting that the at least one characteristic has a higher effect value than another characteristic of the set of characteristics, wherein the effect value indicates a likelihood that workers having the characteristic will provide an accurate response to a particular task;

calculating an effect value for each attribute of the plurality of attributes of the at least one characteristic, wherein the effect value indicates a likelihood that workers having the attribute for the characteristic will provide an accurate response to the particular task;

ranking the attributes by the effect values to generate a subgroup based on a higher ranked attribute;

modifying the target worker group to include workers from the subgroup, the target worker group comprising the workers corresponding to a first attribute; and providing the particular task to the target work group; and modify a machine learning model to perform a classification task via training on a label identified in a response of each worker in the target worker group to the particular task.

10. The one or more computer-readable storage devices of claim 9, wherein the top-down technique comprises a plurality of instructions that, when executed by the processor, cause the processor to:

detect a second attribute from a second characteristic that corresponds to workers that provide responses with an accuracy value above a threshold value;

generate a subgroup of workers, the subgroup of workers comprising workers corresponding to the first attribute and the second attribute; and modify the target worker group to include workers from the subgroup.

11. The one or more computer-readable storage devices of claim 10, wherein the plurality of instructions, when executed by the processor, cause the processor to:

detect the target worker group is to include a number of workers that exceeds a threshold value; and modify the target worker group to include additional workers using the top-down technique, wherein the number of workers in the modified target worker group exceeds the threshold value.

12. The one or more computer-readable storage devices of claim 9, wherein identifying the target worker group comprises a bottom-up technique.

13. The one or more computer-readable storage devices of claim 12, wherein the bottom-up technique comprises a plurality of instructions that, when executed by the processor, cause the processor to:

calculate an effect value for a second attribute;

detect that the effect value for the second attribute exceeds a threshold value;

generate a modified target worker group comprising the target worker group and workers that correspond to the second attribute.

14. A computing device for identifying a target worker group comprising:
a processor to:
   detect a response to a task from each worker in a group of workers;
   detect a set of characteristics that correspond to each worker, wherein at least one characteristic comprises a plurality of attributes;
   detect the target worker group based on a top-down technique comprising:
      detecting that the at least one characteristic has a higher effect value than another characteristic of the set of characteristics, wherein the effect value indicates a likelihood that workers having the characteristic will provide an accurate response to a particular task;
      calculating an effect value for each attribute of the plurality of attributes of the at least one characteristic, wherein the effect value indicates a likelihood that workers having the attribute for the characteristic will provide an accurate response to the particular task;
      ranking the attributes by the effect values to generate a subgroup based on a higher ranked attribute;
      modifying the target worker group to include workers from the subgroup, the target worker group comprising the workers corresponding to a first attribute; and
   providing the particular task to the target work group; and
   modify a machine learning model to perform a classification task via training on a label identified in a response of each worker in the target worker group to the particular task.

15. The computing device of claim 14, wherein the processor is to:
   detect a second attribute from a second characteristic that corresponds to workers that provide responses with an accuracy value above a threshold value;
   generate a subgroup of workers, the subgroup of workers comprising workers corresponding to the first attribute and the second attribute; and
   modify the target worker group to include workers from the subgroup.

16. The computing device of claim 15, wherein the processor is to:
   detect the target worker group is to include a number of workers that exceeds a threshold value; and
   modify the target worker group to include additional workers using the top-down technique, wherein the number of workers in the modified target worker group exceeds the threshold value.

17. The computing device of claim 14, wherein the processor is to:
   calculate an effect value for a second attribute;
   detect that the effect value for the second attribute exceeds a threshold value;
   generate a modified target worker group comprising the target worker group and workers that correspond to the second attribute.

\* \* \* \* \*